United States Patent
Wang et al.

(10) Patent No.: US 11,590,480 B2
(45) Date of Patent: Feb. 28, 2023

(54) MOLECULAR SIEVE AND ITS PREPARATION METHOD

(71) Applicants: BAOTOU RESEARCH INSTITUTE OF RARE EARTHS, Baotou (CN); NATIONAL ENGINEERING RESEARCH CENTRE OF RUIKE RARE EARTH METALLURGY AND FUNCTION MATERIALS CO., LTD., Baotou (CN)

(72) Inventors: Yan Wang, Baotou (CN); Zhaoqiang Li, Baotou (CN); Zhiyong Ding, Baotou (CN); Rongrong Fan, Baotou (CN); Cheng Zhang, Baotou (CN); Yu Wang, Baotou (CN); Xin Guo, Baotou (CN); Na Kang, Baotou (CN); Wei Liu, Baotou (CN); Rong Wang, Baotou (CN); Jing Song, Baotou (CN)

(73) Assignees: BAOTOU RESEARCH INSTITUTE OF RARE EARTHS, Baotou (CN); NATIONAL ENGINEERING RESEARCH CENTRE OF RUIKE RARE EARTH METALLURGY AND FUNCTION MATERIALS CO., LTD., Baotou (CN)

( * ) Notice: Subject to any disclaimer, the term of this patent is extended or adjusted under 35 U.S.C. 154(b) by 0 days.

(21) Appl. No.: 17/330,137

(22) Filed: May 25, 2021

(65) Prior Publication Data
US 2021/0283586 A1   Sep. 16, 2021

(30) Foreign Application Priority Data
Jul. 13, 2020   (CN) .......................... 202010669029.4

(51) Int. Cl.
B01J 29/70     (2006.01)
B01J 35/10     (2006.01)
(Continued)

(52) U.S. Cl.
CPC ....... B01J 29/7065 (2013.01); B01J 35/1023 (2013.01); B01J 35/1028 (2013.01);
(Continued)

(58) Field of Classification Search
None
See application file for complete search history.

(56) References Cited

FOREIGN PATENT DOCUMENTS

| CN | 108905603 A | 11/2018 |
| CN | 110102337 A | 8/2019 |
| CN | 110252392 A | 9/2019 |

*Primary Examiner* — Yun Qian
(74) *Attorney, Agent, or Firm* — Osha Bergman Watanabe & Burton LLP

(57) ABSTRACT

The present invention discloses a molecular sieve and its preparation method. The molecular sieve has micromorphology in a football shape and consists of molecular sieve framework and active elements. The molecular sieve framework comprises silicon element and aluminum element; the active elements comprise copper element and rare earth elements. The rare earth elements are one or more selected from the group consisting of La, Ce, Pr, Nd, Pm, Sm, Eu, Sc and Y. The mass ratio of the silicon element to the aluminum element is 3-9:1. The content of the copper element in the molecular sieve is 1.5-3.2 wt %. The mass of rare earth elements is 50 ppm-2 wt % of the molecular sieve framework. The mass of the silicon element is calculated by silicon dioxide, the mass of aluminum element is calculated by aluminum oxide, the mass of copper element is calculated by copper oxides, and the mass of rare earth elements is calculated by rare earth oxides. The molecular sieve has a high catalytic activity in a temperature range of 175-550° C. and a good resistance to hydrothermal aging.

3 Claims, 3 Drawing Sheets

(51) Int. Cl.
  *B01J 37/06* (2006.01)
  *B01J 37/10* (2006.01)
  *B01J 37/34* (2006.01)
  *F01N 3/08* (2006.01)
  *F01N 3/20* (2006.01)
(52) U.S. Cl.
  CPC ....... *B01J 35/1038* (2013.01); *B01J 35/1042* (2013.01); *B01J 35/1057* (2013.01); *B01J 37/06* (2013.01); *B01J 37/10* (2013.01); *B01J 37/346* (2013.01); *F01N 3/0842* (2013.01); *F01N 3/2066* (2013.01); *B01J 2219/1948* (2013.01); *F01N 2370/04* (2013.01)

US 11,590,480 B2

MOLECULAR SIEVE AND ITS PREPARATION METHOD

TECHNICAL FIELD OF THE INVENTION

The present invention relates to a molecular sieve and its preparation method.

BACKGROUND OF THE INVENTION

Zeolite molecular sieve has been widely used in the fields of adsorption, separation and catalysis due to its high stability, regular uniform pores and adjustable acidity and alkalinity. The selective catalytic reduction (SCR) technology for removing nitrogen oxides (NOx) by molecular sieve loaded with transition metals, such as copper, has been developed rapidly. Rare earth elements can further improve the catalytic activity of molecular sieve catalyst.

CN110102337A discloses a preparation method of a composite copper-based SCR molecular sieve catalyst. N,N,N-trimethyl-1-adamantyl ammonium hydroxide is mixed with water during stirring, aluminum sulfate is added during stirring, the pH value is adjusted by an alkali, silica sol is added during stirring, and an initial gel mixture is obtained; the initial gel mixture is crystallized at the constant temperature, cooled, washed, dried and calcined to obtain a CHA-type molecular sieve; the CHA-type molecular sieve is used as a carrier, manganese nitrate, cerium nitrate, palladium nitrate and copper acetate are impregnated stepwise, and then drying is carried out to obtain the composite copper-based SCR molecular sieve catalyst. In this method, a CHA-type molecular sieve is firstly synthesized by the hydrothermal method, and then impregnation is performed so that modifying elements are loaded on molecular sieve. The crystal type of the molecular sieve obtained by this method is cube, which results in a poor catalytic performance at a low temperature or a high temperature.

CN110252392A discloses a preparation method of a cerium modified Cu-SAPO-34 molecular sieve catalyst. Cu-TEPA is synthesized with a copper source and tetraethylenepentamine, a first gel is prepared with a phosphorus source and an aluminum source; Cu-TEPA is mixed with the first gel, a silicon source and a template to obtain a second gel; a cerium source is added dropwise to the second gel to obtain a third gel; the third gel is transferred to a hydrothermal kettle for crystallization, and the crystallized product is cooled, filtered, washed with water, dried and roasted to obtain Cu-SAPO-34 catalyst partially substituted by cerium. CN108905603A discloses a preparation method of CuCeSAPO-34 molecular sieve. Tetraethylammonium hydroxide is added into deionized water and stirred. As a uniform solution is obtained, aluminum isopropoxide is added till it is completely dissolved. Then orthophosphoric acid and ethyl orthosilicate are added and stirred to obtain a uniform solution. A cerium salt is added into the uniform solution. After fully stirring the solution and the cerium salt, a copper salt is added and completely stirred to obtain a sol. The sol is added into a hydrothermal reactor for crystallization reaction. After the crystallization reaction is completed, cooling is performed at room temperature. The solid crystallization product is separated from the mother liquor, and washed with deionized water until the solid crystallization product is neutral. The washed solid crystallization product is dried before being calcined in air to obtain the CuCeSAPO-34 molecular sieve. In the above methods, a molecular sieve is synthesized by one-step hydrothermal synthesis method. The crystal structure of obtained molecular sieve is not in a football shape, leading to a poor catalytic performance at a low temperature or a high temperature.

SUMMARY OF THE INVENTION

In view of this, the purpose of the present invention is to provide a molecular sieve which has micromorphology in football shape. Further, the molecular sieve has a large specific surface area. Further, the molecular sieve of the present invention has a high catalytic activity in a temperature range of 175-550° C. and a good resistance to hydrothermal aging.

Another purpose of the present invention is to provide a method for preparing a molecular sieve, wherein the obtained molecular sieve has micromorphology in football shape. Further, the obtained molecular sieve by this method has a large specific surface area. Further, the obtained molecular sieve by this method has a high catalytic activity in a temperature range of 175-550° C. and a good resistance to hydrothermal aging.

In one aspect, the present invention provides a molecular sieve which has micromorphology in a football shape and consists of molecular sieve framework and active elements, wherein the molecular sieve framework comprises silicon element and aluminum element, the active elements comprises copper element and rare earth elements, and the rare earth elements are one or more selected from the group consisting of La, Ce, Pr, Nd, Pm, Sm, Eu, Sc and Y;

wherein the mass ratio of the silicon element to the aluminum element is 3-9:1, the content of the copper element in the molecular sieve is 1.5-3.2 wt %, the mass of rare earth elements is 50 ppm-2 wt % of the molecular sieve framework;

wherein the mass of the silicon element is calculated by silicon dioxide, the mass of aluminum element is calculated by aluminum oxide, the mass of copper element is calculated by copper oxides, and the mass of rare earth elements is calculated by rare earth oxides.

According to the molecular sieve of the present invention, preferably, the molecular sieve has a pore size less than 0.7 nm, a specific surface area more than 500 m$^2$/g, a pore volume of 0.2-1 mL/g, and an acid amount of 0.8-1.5 mmol/g.

According to the molecular sieve of the present invention, preferably, the molecular sieve also comprise alkali metal elements, the content of the alkali metal elements is equal to or less than 200 ppm; wherein the mass of the alkali metal elements is calculated by alkali metal oxide.

According to the molecular sieve of the present invention, preferably, the molecular sieve is a CHA-type molecular sieve.

In another aspect, the present invention provides a preparation method of the molecular sieve above, which comprises the following steps:

(1) utilizing templates, an alkali metal inorganic base, a silicon source, an aluminum source and water to obtain a first mixture, and performing the first hydrothermal synthesis reaction;

(2) mixing the reaction product obtained in step (1) with an ammonium source and a copper source to obtain a second mixture, and performing the second hydrothermal synthesis reaction;

(3) mixing the reaction product obtained in step (2) with a rare earth source to obtain a third mixture, and performing the third hydrothermal synthesis reaction;

(4) performing solid-liquid separation of the reaction product obtained in step (3), and calcining the obtained solid substance in the reaction product to obtain the molecular sieve.

According to the preparation method of the present invention, preferably, the templates are one or more selected from the group consisting of N,N,N-trimethyl-1-adamantyl ammonium hydroxide, benzyl trimethyl ammonium, copper-tetraethylenepentamine complex, tetraethylammonium hydroxide and tetrapropylammonium hydroxide; the alkali metal inorganic base is one or more selected from the group consisting of lithium hydroxide, sodium hydroxide and potassium hydroxide; the silicon source is one or more selected from the group consisting of silicate esters, silica, fumed silica, silica sol and colloidal silica; the aluminum source is one or more selected from the group consisting of pseudo boehmite, aluminum hydroxide, aluminum sol and sodium metaaluminate; the ammonium source is one or more selected from the group consisting of ammonium nitrate and ammonium chloride; the copper source is one or more selected from the group consisting of copper nitrate, copper sulfate, copper chloride, copper gluconate, copper propionate, copper acetate, copper isopropate and copper-glutamate chelate; the rare earth source is one or more selected from the group consisting of rare earth oxide, rare earth nitrate and rare earth acetate.

According to the preparation method of the present invention, preferably, the molar ratio of the silicon source to the aluminum source is 1-20:1, the molar ratio of the alkali metal inorganic base to the aluminum source is 5.1-15.3:1, the molar ratio of the templates to the aluminum source is 1.0-10:1, and the molar ratio of the water to the aluminum source is 550-1000:1; the molar ratio of the copper source to the aluminum source is 0.6-8:1, the molar ratio of the ammonium source to the aluminum source is 2.1-8:1; the mass of rare earth source is 50 ppm-2 wt % of the solid substance in the reaction product obtained in step (1); wherein the mass of the silicon source is calculated by silicon dioxide, the mass of aluminum source is calculated by aluminum oxide, the mass of alkali metal inorganic base is calculated by alkali metal oxides, the mass of the copper source is calculated by copper oxides, the mass of the ammonium source is calculated by $NH_4^+$, and the mass of the rare earth source is calculated by rare earth oxides.

According to the preparation method of the present invention, preferably, the temperature of the first hydrothermal synthesis reaction is 80-180° C., and the reaction time is 1-5 days; wherein the temperature of the second hydrothermal synthesis reaction is 40-100° C., and the reaction time is 4-48 h; wherein the temperature of the third hydrothermal synthesis reaction is 40-80° C., and the reaction time is 4-48 h; wherein the solid substance is calcined by a way of microwave roasting, the calcination temperature is 500-800° C. and the calcination time is 3-10 h.

According to the preparation method of the present invention, preferably, in step (1), the templates, the alkali metal inorganic base and water are mixed at a temperature of 40-80° C. and then mixed with the silicon source and the aluminum source to obtain the first mixture.

According to the preparation method of the present invention, preferably, the solid-liquid separation comprises the following procedure:
filtering and washing the reaction product obtained in step (3), and then drying by a way of microwave drying, where the microwave drying temperature is 60-110° C., the microwave drying time is 3-8 h.

In the present invention, a molecular sieve with micromorphology in football shape is prepared with a multi-step hydrothermal synthesis method. The molecular sieve has an ultramicropore structure with a large specific surface area and a high pore volume. Further, the molecular sieve has a high catalytic activity in a temperature range of 175-550° C. and a good resistance to hydrothermal aging.

DETAIL DESCRIPTION OF THE INVENTION

Figure 1:
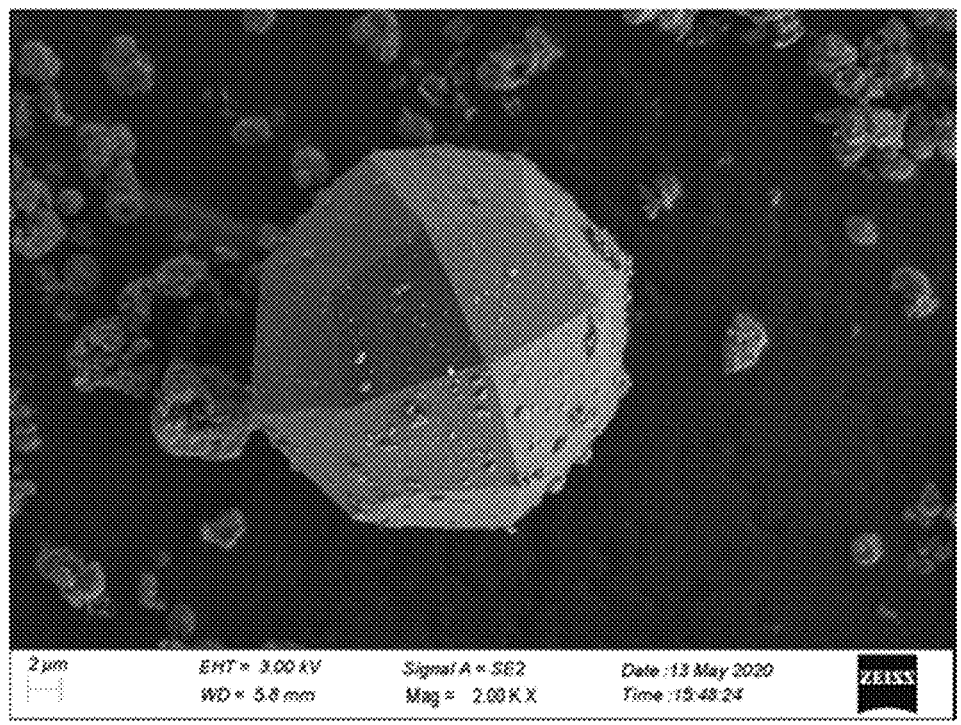
FIG. 1 is the scanning electron microscope photo of the molecular sieve prepared in example 1 of the present invention.

MA The present invention will be further explained in combination with specific embodiments, but the protection scope of the present invention is not limited thereto.

'Specific surface area' refers to the total area that per unit mass of material has.

'Pore size' refers to the distance between two opposite walls of a pore.

'Acid amount' refers to the mmol numbers of acid sites on per unit mass of a catalyst.

<Molecular Sieve>

The molecular sieve of the present invention has micromorphology in football shape and consists of molecular sieve framework and active elements. The molecular sieve framework comprises silicon element and aluminum element, the active elements comprise copper element and rare earth elements. The silicon element and the aluminum element exist in the form of atoms, and the copper element and the rare earth elements exist in the form of ions. According to an embodiment of the present invention, the crystal of the molecular sieve of the present invention has micromorphology in a football shape. The molecular sieve of the present invention can be CHA-type molecular sieve.

In the present invention, the rare earth elements are one or more selected from the group consisting of La, Ce, Pr, Nd, Pm, Sm, Eu, Sc and Y. Preferably, the rare earth elements are one selected from the group consisting of Ce and Y. More preferably, the rare earth element is Ce.

In the molecular sieve of the present invention, the mass ratio of the silicon element to the aluminum element is 3-9:1. Preferably, the mass ratio of the silicon element to the aluminum element is 5-9:1. More preferably, the mass ratio of the silicon element to the aluminum element is 8-9:1. The mass of the silicon element is calculated by silicon dioxide, and the mass of aluminum element is calculated by aluminum oxide. In such a way, the specific surface area and the catalytic activity of the molecular sieve can be increased.

In the present invention, the content of the copper element in the molecular sieve is 1.5-3.2 wt %; preferably, 1.5-2.5 wt %; more preferably, 2.2-2.5 wt %. The mass of copper element is calculated by copper oxides. In such a way, the specific surface area and the catalytic activity of the molecular sieve can be increased.

In the present invention, the mass of rare earth elements is 50 ppm-2 wt % of the molecular sieve framework; preferably, 50 ppm-500 ppm; more preferably, 100 ppm-250 ppm. The mass of rare earth elements is calculated by rare earth oxides. In such a way, the specific surface area and the catalytic activity of the molecular sieve can be increased.

The molecular sieve of the present invention may also comprise alkali metal elements in a small amount, such as Na, K and the like. The content of the alkali metal elements may be less than or equal to 200 ppm. Preferably, the content of the alkali metal elements is less than or equal to 150 ppm. More preferably, the content of the alkali metal elements is less than or equal to 100 ppm. The mass of the alkali metal elements is calculated by alkali metal oxide.

The molecular sieve of the present invention has an ultramicropore structure, and its pore size is less than 0.7 nm. Preferably, the pore size of the molecular sieve is less than 0.65 nm. More preferably, the pore size of the molecular sieve is 0.6-0.65 nm.

The molecular sieve of the present invention has a specific surface area more than 500 $m^2/g$. Preferably, the molecular sieve has a specific surface area more than 600 $m^2/g$. More preferably, the molecular sieve has a specific surface area more than 700 $m^2/g$.

The molecular sieve of the present invention has a pore volume of 0.2-1 mL/g; preferably, 0.5-1 mL/g; more preferably, 0.7-1 mL/g.

The molecular sieve of the present invention has an acid amount of 0.8-1.5 mmol/g; preferably, 1-1.5 mmol/g; more preferably, 1.2-1.5 mmol/g.

The molecular sieve catalyst of the present invention has a broader temperature window. In the range of 175-550° C., the conversion rate of nitrogen oxide is more than 89%; preferably, the conversion rate of nitrogen oxide is more than 90%; more preferably, the conversion rate of nitrogen oxide is more than 92.5%.

<Preparation Method of Molecular Sieve>

The preparation method of molecular sieve of the present invention comprises the following steps: (1) first hydrothermal synthesis reaction step; (2) second hydrothermal synthesis reaction step; (3) third hydrothermal synthesis reaction step; (4) calcination step. The composition and properties of the obtained molecular sieve are as described previously. Detailed description is given below.

First Hydrothermal Synthesis Reaction Step

Templates, an alkali metal inorganic base, a silicon source, an aluminum source and water are used to prepare a first mixture, and the first hydrothermal synthesis reaction is carried out.

The aluminum source of the present invention may be one or more selected from the group consisting of pseudo boehmite, aluminum hydroxide, aluminum sol and sodium metaaluminate. Preferably, the aluminum source is one or more selected from the group consisting of aluminum sol and sodium metaaluminate. More preferably, the aluminum source is selected from the group consisting of sodium metaaluminate. The aluminum sol may have a content of 5-15 wt %, pH of 3-5, viscosity of 35-50 mPa·s and a particle size of 5-15 nm.

The templates of the present invention may be one or more selected from the group consisting of N,N,N-trimethyl-1-adamantyl ammonium hydroxide, benzyl trimethyl ammonium, copper-tetraethylenepentamine complex, tetraethylammonium hydroxide and tetrapropylammonium hydroxide. Preferably, the templates are one or more selected from the group consisting of N,N,N-trimethyl-1-adamantyl ammonium hydroxide, benzyl trimethyl ammonium, copper-tetraethylenepentamine complex. More preferably, the template is N,N,N-trimethyl-1-adamantyl ammonium hydroxide. The molar ratio of the templates to the aluminum source may be 1.0-10:1; preferably, 1.3-8:1; more preferably, 1.3-6:1. The aluminum source is calculated by aluminum oxide. In such a way, the specific surface area and the catalytic activity of the molecular sieve can be increased.

The silicon source of the present invention may be one or more selected from the group consisting of silicate esters, silica, fumed silica, silica sol and colloidal silica. Preferably, the silicon source is one or more selected from the group consisting of silica sol and colloidal silica. More preferably, the silicon source is silica sol. The silica sol may have a solid content of 15-25 wt %, pH of 3-6, a density of 1-2 $g/cm^3$ and a particle size of 8-15 nm. The molar ratio of the silicon source to the aluminum source may be 1-20:1; preferably, 10-20:1; more preferably, 12-18:1. The silicon source is calculated by silicon dioxide, and the aluminum source is calculated by aluminum oxide. In such a way, the specific surface area and the catalytic activity of the molecular sieve can be increased.

The alkali metal inorganic base of the present invention may be alkali metal hydroxide. The example of the alkali metal hydroxide includes but is not limited to lithium hydroxide, sodium hydroxide or potassium hydroxide. Preferably, the alkali metal inorganic base is one or more selected from the group consisting of sodium hydroxide and potassium hydroxide. More preferably, the alkali metal inorganic base is sodium hydroxide. The molar ratio of the alkali metal inorganic base to the aluminum source may be 5.1-15.3:1; preferably, 6-12:1; more preferably, 7-10:1. The alkali metal inorganic base is calculated by alkali metal oxides, and the aluminum source is calculated by aluminum oxide. In such a way, the molecular sieve with micromorphology in football shape may be obtained. Preferably, the molecular sieve with crystal morphology in football shape may be obtained.

In the present invention, the molar ratio of the water to the aluminum source may be 550-1000:1; preferably, 700-900:1; more preferably, 800-900:1.

In the present invention, the temperature of the first hydrothermal synthesis reaction may be 80-180° C.; preferably, 100-150° C.; more preferably, 100-120° C. The reaction time of the first hydrothermal synthesis reaction may be 1-5 days; preferably, 1-4 days; more preferably, 1-2 days. In such a way, the molecular sieve with micromorphology in football shape may be obtained. Preferably, the molecular sieve with crystal morphology in football shape may be obtained.

According to an embodiment of the present invention, the templates, the alkali metal inorganic base and water are mixed before mixing with the silicon source and the aluminum source to obtain the first mixture. The templates, the alkali metal inorganic base and water may be mixed at a temperature of 40-80° C. Preferably, the templates, the alkali metal inorganic base and water may be mixed at a temperature of 50-70° C. Preferably, the templates, the alkali metal inorganic base and water may be mixed with heating under reflux.

Second Hydrothermal Synthesis Reaction Step

The reaction product obtained in step (1) is mixed with an ammonium source and a copper source to obtain a second mixture, and the second hydrothermal synthesis reaction is carried out.

In the present invention, the ammonium source is one or more selected from the group consisting of ammonium nitrate and ammonium chloride. Preferably, the ammonium source is ammonium nitrate. The molar ratio of the ammonium source to the aluminum source is 2.1-8:1; preferably, 4-8:1; more preferably, 4-7:1. The ammonium source is calculated by $NH_4^+$, and the aluminum source is calculated by aluminum oxide. In such a way, the specific surface area and the catalytic activity of the molecular sieve can be increased.

In the present invention, the copper source is one or more selected from the group consisting of copper nitrate, copper sulfate, copper chloride, copper gluconate, copper propionate, copper acetate, copper isopropate and copper-glutamate chelate. Preferably, the copper source is one or more selected from the group consisting of copper-glutamate chelate and copper acetate. More preferably, the copper source is copper-glutamate chelate. The molar ratio of the copper source to the aluminum source is 0.6-8:1; preferably, 4-8:1; more preferably, 4-7:1. The copper source is calculated by copper oxides, and the aluminum source is calculated by aluminum oxide. In such a way, the specific surface area and the catalytic activity of the molecular sieve can be increased.

In the present invention, the temperature of the second hydrothermal synthesis reaction may be 40-100° C.; preferably, 50-90° C.; more preferably, 70-90° C. The reaction time of the second hydrothermal synthesis reaction may be 4-48 h; preferably, 4-20 h; more preferably, 8-15 h. In such a way, the molecular sieve with micromorphology in football shape may be obtained, and the specific surface area and the catalytic activity of the molecular sieve can be increased.

According to an embodiment of the present invention, the reaction product obtained in step (1) is cooled down to 20-35° C., and then is mixed and stirred with an ammonium source for 3-15 h to obtain mixture A; and then mixture A is mixed and stirred with a copper source for 1-5 h to obtain a second mixture. Preferably, the reaction product obtained in step (1) is cooled down to 25-30° C., and then is mixed and stirred with an ammonium source for 5-10 h to obtain mixture A; and then mixture A is mixed and stirred with a copper source for 2-4 h to obtain a second mixture.

Third Hydrothermal Synthesis Reaction Step

The reaction product obtained in step (2) is mixed with a rare earth source to obtain a third mixture, and the third hydrothermal synthesis reaction is carried out.

In the present invention, the rare earth source is one or more selected from the group consisting of rare earth oxide, rare earth nitrate and rare earth acetate. The rare earth element is one or more selected from the group consisting of La, Ce, Pr, Nd, Pm, Sm, Eu, Sc and Y. Preferably, the rare earth element is one selected from the group consisting of Ce and Y. More preferably, the rare earth element is Ce. In such a way, the molecular sieve with micromorphology in football shape may be obtained, and the specific surface area and the catalytic activity of the molecular sieve can be increased.

In the present invention, the mass of rare earth source is 50 ppm-2 wt % of the solid substance in the reaction product obtained in step (1); preferably, 100 ppm-250 ppm. In such a way, the specific surface area and the catalytic activity of the molecular sieve can be increased.

In the present invention, the temperature of the third hydrothermal synthesis reaction may be 40-80° C.; preferably, 50-70° C.; more preferably, 55-65° C. The reaction time of the third hydrothermal synthesis reaction may be 4-48 h; preferably, 8-20 h; more preferably, 8-15 h. In such a way, the molecular sieve with micromorphology in football shape may be obtained, and the specific surface area and the catalytic activity of the molecular sieve can be increased.

Calcination Step

The solid-liquid separation of the reaction product obtained in step (3) is carried out, and the obtained solid substance is calcined to obtain the molecular sieve.

In the present invention, the solid substance is calcined by a way of microwave roasting. The calcination temperature may be 500-800° C.; preferably, 500-700° C.; more preferably, 500-600° C. The calcination time may be 3-10 h; preferably, 3-8 h; more preferably, 3-6 h.

According to an embodiment of the present invention, the reaction product obtained in step (3) is filtered and washed, and then is dried by a way of microwave drying to obtain solid substance, where the microwave drying temperature is 60-110° C., the microwave drying time is 3-8 h. Preferably, the reaction product obtained in step (3) is filtered and washed, and then is dried by a way of microwave drying to obtain solid substance, where the microwave drying temperature is 70-90° C., the microwave drying time is 4-6 h.

Example 1

(1) 28.4 g of aqueous solution of N,N,N-trimethyl-1-adamantyl ammonium hydroxide (TMAda-OH) (a concentration of 25 wt %), 4.8 g of sodium hydroxide and 85 g of water were heated at 60° C. under reflux so as to be mixed uniformly, and then were mixed and stirred for 2 h with 32.9 g of silica sol (a solid content of 20 wt %, pH of 3.2, density of 1.2 g/cm$^3$, particle size of 11 nm) and 1.17 g of sodium metaaluminate to obtain a first mixture. The first mixture was subjected to the first hydrothermal synthesis reaction, where the reaction temperature was 110° C., the reaction time was 2 days.

(2) The reaction product obtained in step (1) was cooled down to 30° C., and then was mixed and stirred with 3.43 g of ammonium nitrate for 8 h, and 8.9 g of copper-glutamate chelate was added and stirred for 3 h, so as to obtain a second mixture. The second mixture was subjected to the second hydrothermal synthesis reaction, where the reaction temperature was 80° C., the reaction time was 10 h.

(3) The reaction product obtained in step (2) was mixed and stirred with 0.002 g of cerium oxide for 6 h to obtain a third mixture. The third mixture was subjected to the third hydrothermal synthesis reaction, where the reaction temperature was 60° C., the reaction time was 12 h.

(4) The reaction product obtained in step (3) was cooled down to room temperature, filtered and washed, and then the obtained solid substance was dried by a way of microwave drying at 80° C. for 5 h, subsequently, the dried solid substance was calcined by a way of microwave drying at 550° C. for 4 h to obtain a molecular sieve, which was a CHA-type molecular sieve.

Example 2

(1) 34.4 g of aqueous solution of N,N,N-trimethyl-1-adamantyl ammonium hydroxide (TMAda-OH) (a concentration of 25 wt %), 6.72 g of potassium hydroxide and 85 g of water were heated at 50° C. under reflux so as to be mixed uniformly, and then were mixed and stirred for 3 h with 28.5 g of silica sol (a solid content of 20 wt %, pH of 5.6, density of 1.5 g/cm$^3$, particle size of 11 nm) and 7.28 g of aluminum sol (a solid content of 10 wt %, pH of 4, viscosity of 43 mPa·s, particle size of 10 nm) to obtain a first mixture. The first mixture was subjected to the first hydrothermal synthesis reaction, where the reaction temperature was 130° C., the reaction time was 3 days.

(2) The reaction product obtained in step (1) was cooled down to 25° C., and then was mixed and stirred with 4.57 g of ammonium nitrate for 8 h, and 8.6 g of copper acetate was added and stirred for 3 h, so as to obtain a second mixture. The second mixture was subjected to the second hydrothermal synthesis reaction, where the reaction temperature was 70° C., the reaction time was 13 h.

(3) The reaction product obtained in step (2) was mixed and stirred with 0.004 g of yttrium oxide for 6 h to obtain a third mixture. The third mixture was subjected to the third hydrothermal synthesis reaction, where the reaction temperature was 60° C., the reaction time was 12 h.

(4) The reaction product obtained in step (3) was cooled down to room temperature, filtered and washed, and then the obtained solid substance was dried by a way of microwave drying at 80° C. for 5 h, subsequently, the dried solid substance was calcined by a way of microwave drying at 550° C. for 4 h to obtain a molecular sieve, which was a CHA-type molecular sieve.

Comparative Example 1

28.4 g of aqueous solution of N,N,N-trimethyl-1-adamantyl ammonium hydroxide (TMAda-OH) (a concentration of 25 wt %), 4.8 g of sodium hydroxide and 85 g of water, 32.9 g of silica sol (a solid content of 20 wt %, pH of 3.2, density of 1.2 g/cm$^3$, particle size of 11 nm) and 1.17 g of sodium metaaluminate were mixed and stirred for 2 h to obtain a mixture. The mixture was subjected to hydrothermal synthesis reaction, where the reaction temperature was 110° C., the reaction time was 2 days. The reaction product was cooled down to room temperature and filtered, the solid substance was washed with deionized water for three times, and then dried at 80° C. for 5 h before calcining at 550° C. for 4 h, so as to obtain first product.

3.43 g of ammonium nitrate was dissolved in 100 mL of water. After dissolving, it was added into the first product, and reacted at room temperature for 6 h, subsequently, was subjected to filtering. The obtained solid substance was washed with deionized water for three times, dried at 80° C., and then calcined at 550° C. for 3 h, so as to obtain the second product.

8.0 g of copper nitrate was dissolved in 100 mL of water. After dissolving, it was added into the second product, and stirred at room temperature for 8 h, subsequently, was subjected to filtering. The obtained solid substance was washed with deionized water for three times, dried at 80° C. for 5 h, and then calcined at 550° C. for 4 h, so as to obtain zeolite molecular sieve containing copper.

Comparative Example 2

30 g of ammonium chloride was dissolved in 200 g of water, into which CHA-type zeolite B containing potassium ion was added. Then it was stirred at room temperature for 8 h, subsequently, was subjected to filtering. The obtained solid substance was washed with deionized water, and then dried at 100° C. for 24 h, so as to obtain zeolite B without potassium ion. The zeolite B without potassium ion was added into 200 g of saturated aqueous solution of copper acetate, and stirred at room temperature for 8 h, and then filtered. The obtained solid substance was washed with deionized water, and then dried at 100° C. for 24 h. The dried product was calcined at 550° C. for 2 h, so as to obtain zeolite molecular sieve containing copper.

Experimental Example

Specific surface area, pore size and pore volume: the specific surface area of the catalyst was measured by ASAP 2020HD88 from Micromeritics. During the measurement, the degassing temperature was 105° C. and the degassing time was 2 h. The measurement was repeated for three times, and an average value was taken. The results are shown in Table 1.

Determination of each element content: Agilent 5110 plasma equipment (ICP) was used to determine the element content. The results are shown in Table 1.

Acid amount measurement: the ammonia adsorption and desorption performance of the catalyst were measured by a chemical adsorption instrument Quantachrome ASAP 292011 from US. The acid amount was calculated based on the area of ammonia desorption peak. The acid amount may be used to measure the ammonia storage performance of the catalyst. The results are shown in Table 1.

Figure 2:
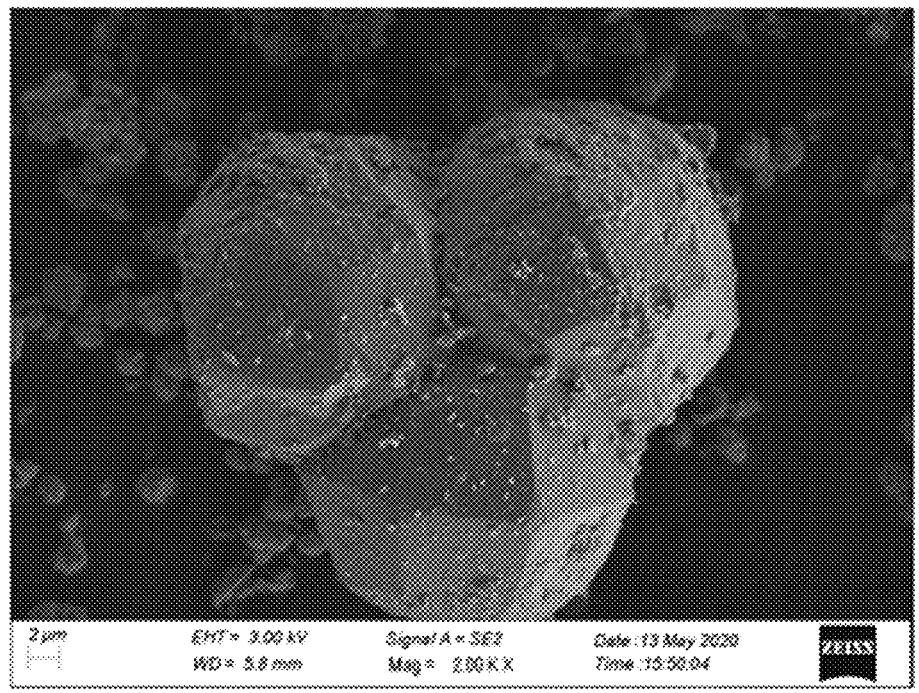
FIG. 2 is the scanning electron microscope photo of the molecular sieve prepared in example 2 of the present invention.
Figure 3:
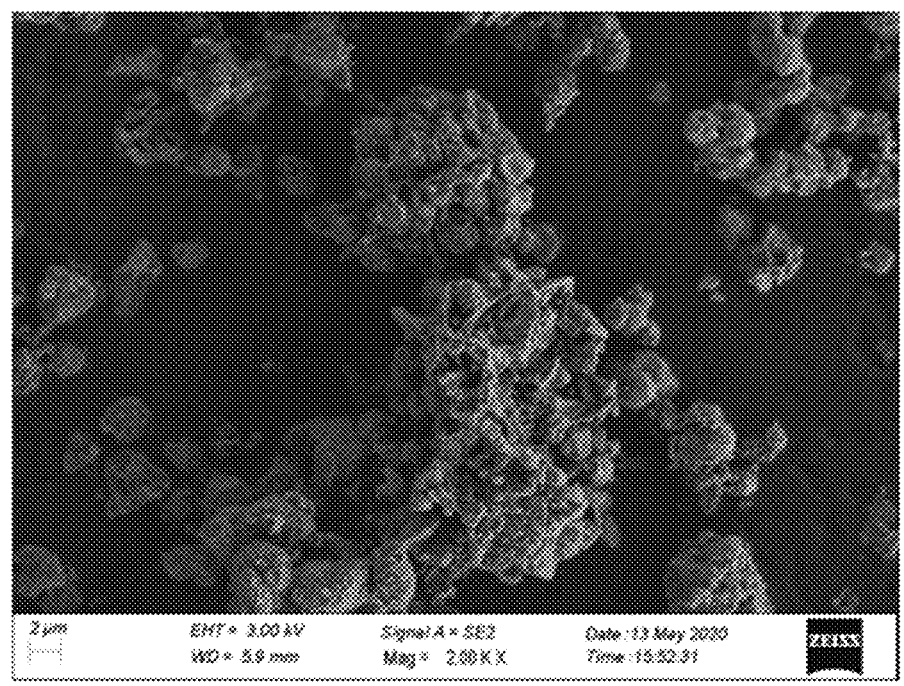
FIG. 3 is the scanning electron microscope photo of the zeolite molecular sieve containing copper prepared in comparative example 1 of the present invention.

Morphology measurement: Sigma 500 field emission scanning electron microscope from Zeiss, Germany was used to measure the micromorphology of the catalyst. A thin layer of platinum was sprayed on the surface of the sample before testing to improve the conductivity of the sample surface. The results are shown in FIGS. 1-3.

Figure 4:
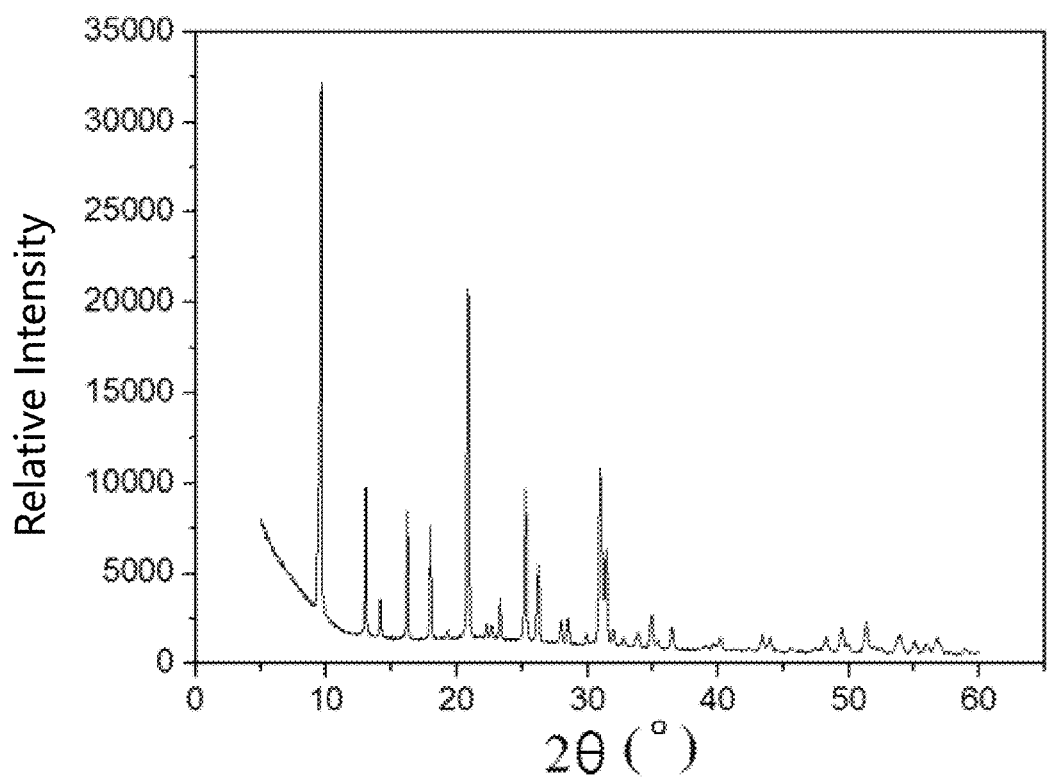
FIG. 4 is the XRD pattern of the molecular sieve prepared in example 1 of the present invention.
Figure 5:
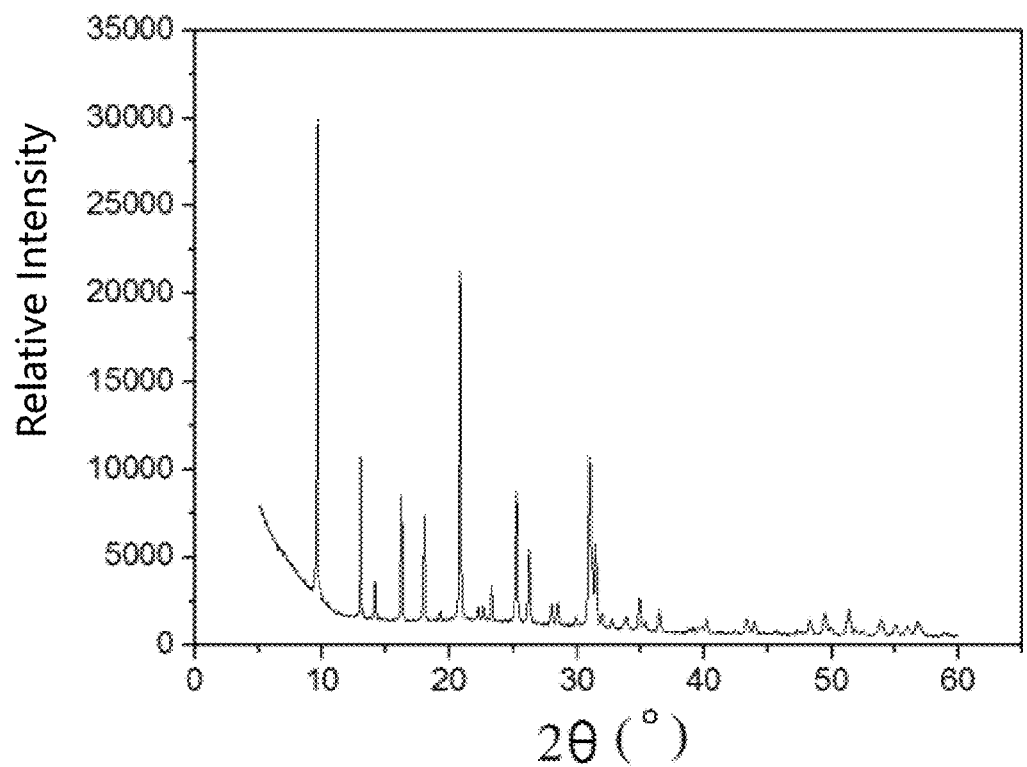
FIG. 5 is the XRD pattern of the molecular sieve prepared in example 2 of the present invention.
Figure 6:
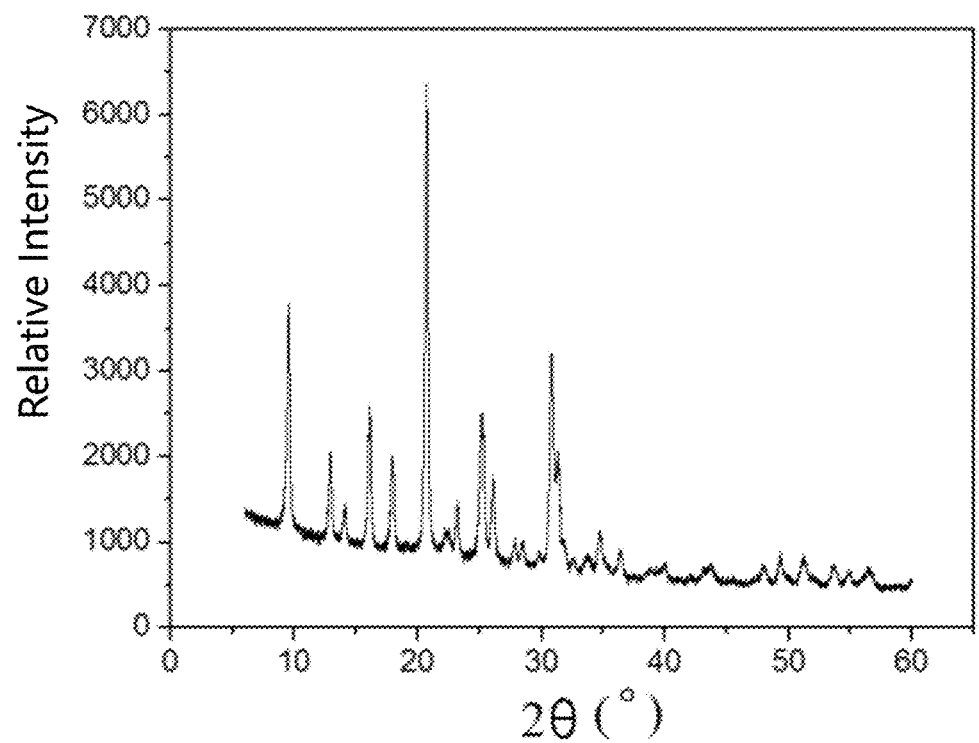
FIG. 6 is the XRD pattern of the zeolite molecular sieve containing copper prepared in comparative example 1 of the present invention.

XRD measurement: The measurement was carried out on a PANalytical X-ray powder diffraction analyzer, using the Cu Kα target with λ=1.5406 Å as the radiation source, 2θ range of the measurement was 5-60° and the step size was 0.02°. The results are shown in FIGS. 4-6.

Method of determining the denitration performance: Gas composition of the reaction (volume ratio): 500 ppm NO, 500 ppm $NH_3$, 12% $O_2$, 10% $H_2O$, $CO_2$ 8%, CO 800 ppm, $C_3H_6$ 80 ppm (C3), $N_2$ as equilibrium gas, gas hourly space velocity (GHSV) of 220000 h$^{-1}$; and the volume ratio of $NH_3$/NO was 1. The gas detection system was a Fourier infrared analyzer. The conditions of the hydrothermal aging of the catalyst: the catalyst was aged at 850° C. for 10 h, and the water content was 10 vol % of the total gas volume. The catalytic performance of fresh catalyst is shown in Table 2, and that of aged catalyst is shown in Table 3.

TABLE 1

Properties of the catalysts

| No. | Micro-morphology | Mass ratio of silicon element to aluminum element | Content of copper element in molecular sieve/ wt % | Mass ratio of rare earth elements to molecular sieve framework/ ppm | Content of alkali metal elements in molecular sieve/ ppm | Specific surface area/ m$^2$/g | Pore size/ nm | Pore volume mL/g | Acid amount mmol/g |
|---|---|---|---|---|---|---|---|---|---|
| Example 1 | Football shape | 8.4 | 2.31 | 189 | Less than 100 | 732 | 0.6142 | 0.8912 | 1.321 |
| Example 2 | Football shape | 7.3 | 2.14 | 313 | Less than 100 | 689 | 0.6031 | 0.8015 | 1.123 |

TABLE 1-continued

Properties of the catalysts

| No. | Micro-mor-phology | Mass ratio of silicon element to aluminum element | Content of copper element in molecular sieve/ wt % | Mass ratio of rare earth elements to molecular sieve framework/ ppm | Content of alkali metal elements in molecular sieve/ ppm | Specific surface area/ m²/g | Pore size/ nm | Pore volume mL/g | Acid amount mmol/ g |
|---|---|---|---|---|---|---|---|---|---|
| Comparative Example 1 | Non-football shape | 8.4 | 3.14 | — | Less than 100 | 432 | 0.7642 | 0.3912 | 0.321 |
| Comparative Example 2 | — | | 4.4 | — | — | — | 479 | — | — | — |

Notes: the mass of the silicon element is calculated by silicon dioxide, the mass of the aluminum element is calculated by aluminum oxide, the content of the copper element is calculated by copper oxides, and the content of the rare earth elements is calculated by rare earth oxides.

TABLE 2

Catalytic performance of fresh catalysts

| | Conversion rate of NO (%) | | | | | |
|---|---|---|---|---|---|---|
| No. | 150° C. | 175° C. | 200° C. | 450° C. | 500° C. | 550° C. |
| Example 1 | 69 | 93 | 100 | 100 | 100 | 92.5 |
| Example 2 | 65 | 89 | 98 | 100 | 100 | 90 |
| Comparative Example 1 | 43 | 75 | 92 | 99 | 95 | 75 |
| Comparative Example 2 | 59 | 82 | 91 | 99 | 95 | 88 |

TABLE 3

Catalytic performance of aged catalysts

| | Conversion rate of NO (%) | | | | | |
|---|---|---|---|---|---|---|
| No. | 150° C. | 175° C. | 200° C. | 450° C. | 500° C. | 550° C. |
| Example 1 | 67 | 93 | 100 | 100 | 98 | 90.5 |
| Example 2 | 65 | 87 | 98 | 100 | 95 | 88 |
| Comparative Example 1 | 23 | 51 | 70 | 92 | 78 | 45 |
| Comparative Example 2 | 27 | 58 | 80 | 66 | 51 | 30 |

It can be seen from the above tables that the molecular sieve of the present invention has excellent denitration performance in both of low temperature region (below 200° C.) and high temperature region (above 500° C.), and its denitration performance decreases slightly after hydrothermal aging of 850° C./10 h.

The present invention is not limited by the above embodiments. All variations, modifications and replacements to the disclosed embodiments which are apparent to those skilled in the art and do not depart from the essence of the present invention fall in the scope of the present invention.

What is claimed is:

1. A method for preparing a molecular sieve, comprising the following steps:

(1) utilizing N,N,N-trimethyl-1-adamantyl ammonium hydroxide, sodium hydroxide, silica sol, sodium metaaluminate and water to obtain a first mixture, and performing a first hydrothermal synthesis reaction to obtain a first reaction product;

(2) mixing the first reaction product obtained in step (1) with ammonium nitrate and copper-glutamate chelate to obtain a second mixture, and performing a second hydrothermal synthesis reaction to obtain a second reaction product;

(3) mixing the second reaction product obtained in step (2) with rare earth oxide to obtain a third mixture, and performing a third hydrothermal synthesis reaction to obtain a third reaction product;

(4) performing solid-liquid separation of the third reaction product obtained in step (3) to obtain solid substance in the third reaction product, and calcining the obtained solid substance in the third reaction product to obtain the molecular sieve;

wherein a molar ratio of silica sol to sodium metaaluminate is 1-20:1, a molar ratio of sodium hydroxide to sodium metaaluminate is 5.1-15.3:1, a molar ratio of N,N,N-trimethyl-1-adamantyl ammonium hydroxide to sodium metaaluminate is 1.0-10:1, and a molar ratio of water to sodium metaaluminate is 550-1000:1; wherein a molar ratio of copper-glutamate chelate to sodium metaaluminate is 0.6-8:1, a molar ratio of ammonium nitrate to sodium metaaluminate is 2.1-8:1; a mass of rare earth oxide is 50 ppm-2 wt % of the solid substance in the reaction product obtained in step (1);

wherein silica sol is calculated by silicon dioxide, sodium metaaluminate is calculated by aluminum oxide, sodium hydroxide is calculated by sodium oxides, copper-glutamate chelate is calculated by copper oxides, ammonium nitrate is calculated by $NH_4^+$;

wherein a temperature of the first hydrothermal synthesis reaction is 80-180° C., and the reaction time of the first hydrothermal synthesis reaction is 1-5 days; a temperature of the second hydrothermal synthesis reaction is 40-100° C., and reaction time of the second hydrothermal synthesis reaction is 4-48 hours; a temperature of the third hydrothermal synthesis reaction is 40-80° C., and reaction time of the third hydrothermal synthesis reaction is 4-48 hours; the solid substance is calcined by microwave roasting at a calcination temperature of 500-800° C. for 3-10 hours.

2. The method according to claim 1, wherein the N,N,N-trimethyl-1-adamantyl ammonium hydroxide, sodium hydroxide and water are mixed at a temperature of 40-80° C. and then mixed with the silica sol and the sodium metaaluminate to obtain the first mixture.

3. The method according to claim 1, wherein the solid-liquid separation comprises the following procedure:
   filtering and washing the reaction product obtained in step (3), and then drying by microwave drying at a temperature of 60-110° C. for 3-8 hours.

* * * * *